June 1, 1937. H. E. HALLENBECK 2,082,393
ELECTRICAL CONTROL MECHANISM FOR TROLLEY BUCKET PLANTS
Filed Oct. 27, 1930  8 Sheets-Sheet 1

INVENTOR
*H.E.Hallenbeck*

BY

ATTORNEYS

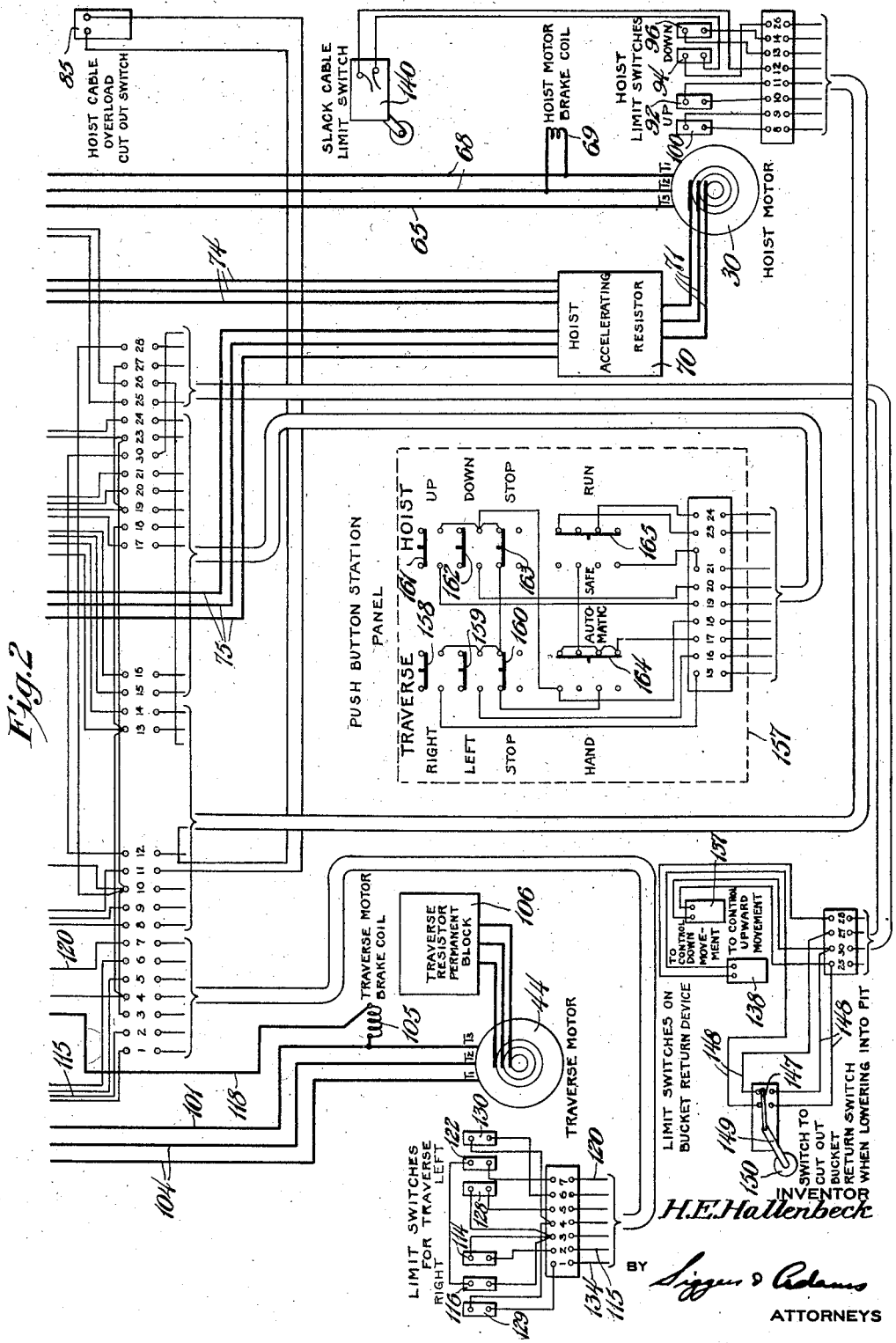

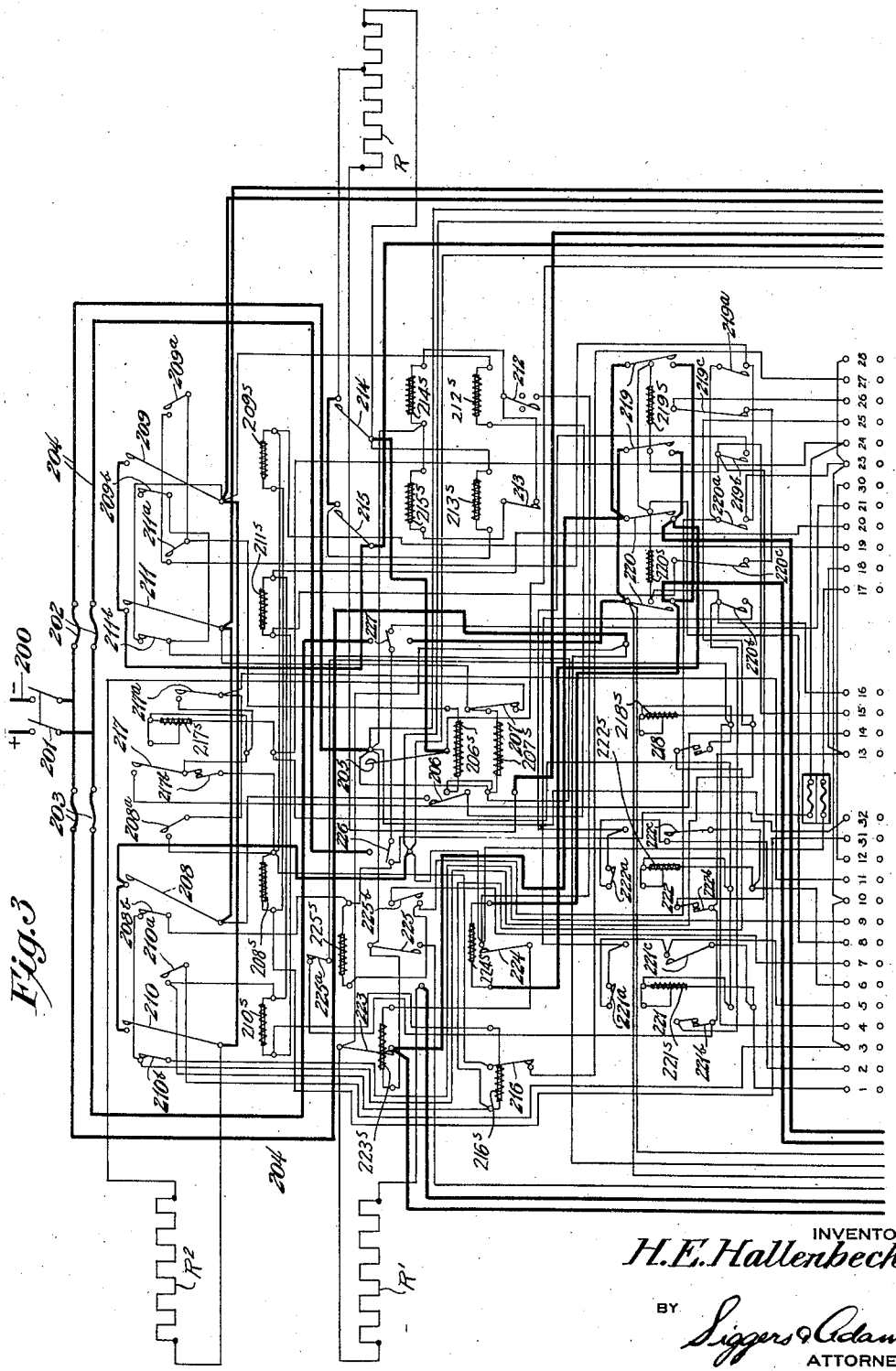

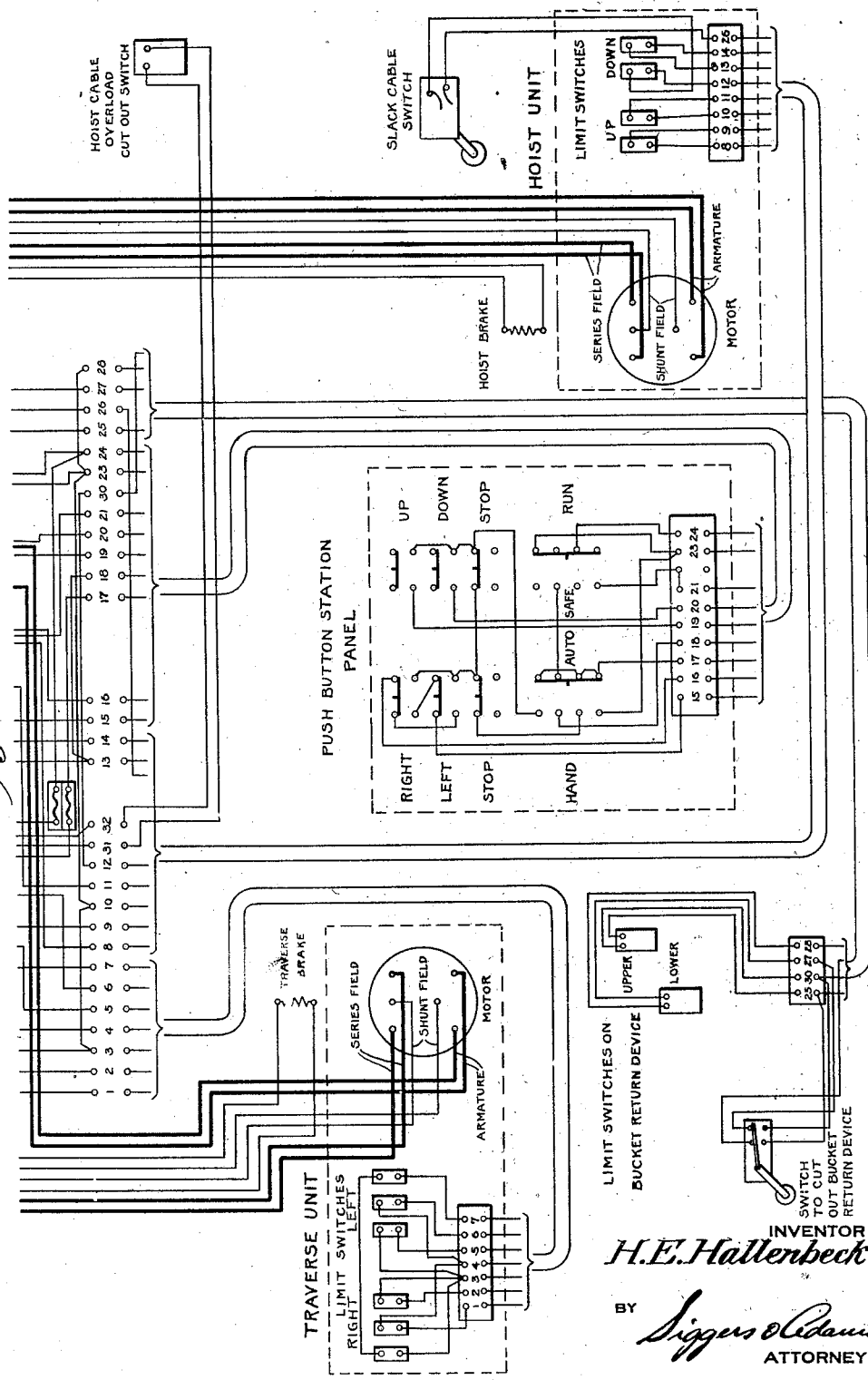

June 1, 1937. H. E. HALLENBECK 2,082,393
ELECTRICAL CONTROL MECHANISM FOR TROLLEY BUCKET PLANTS
Filed Oct. 27, 1930 8 Sheets-Sheet 5

INVENTOR
H.E.Hallenbeck
BY
Siggers & Adams
ATTORNEYS

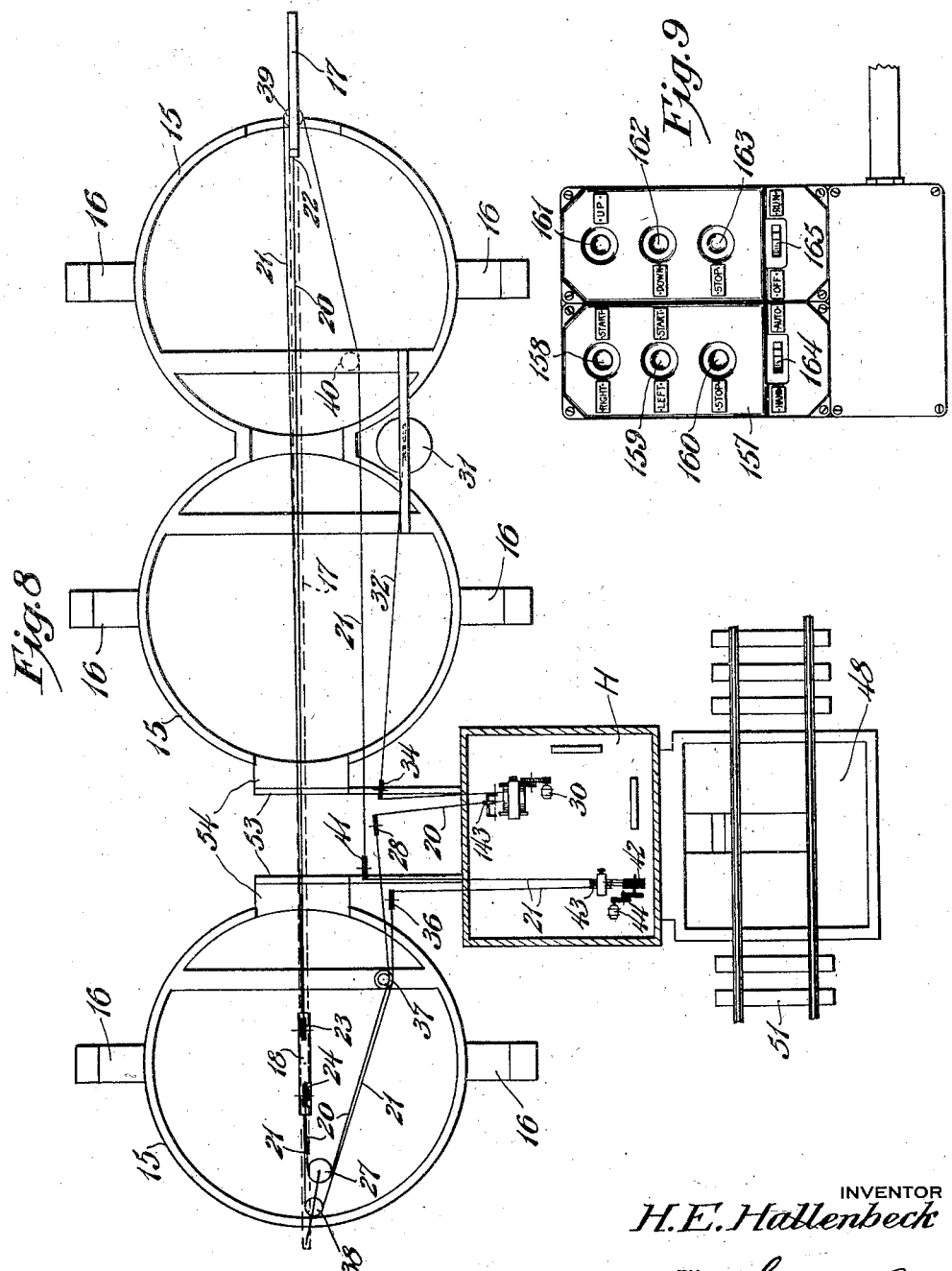

June 1, 1937.  H. E. HALLENBECK  2,082,393
ELECTRICAL CONTROL MECHANISM FOR TROLLEY BUCKET PLANTS
Filed Oct. 27, 1930  8 Sheets-Sheet 8

INVENTOR
H.E. Hallenbeck
BY
Siggers & Adams
ATTORNEYS

Patented June 1, 1937

2,082,393

UNITED STATES PATENT OFFICE 2,082,393

ELECTRICAL CONTROL MECHANISM FOR TROLLEY BUCKET PLANTS

Harold E. Hallenbeck, Hudson, N. Y., assignor to Gifford-Wood Company, Hudson, N. Y., a corporation of New York Application October 27, 1930, Serial No. 491,534

48 Claims. (Cl. 212—132)

REISSUED

This invention relates to electrically driven trolley bucket systems, and among other objects, aims to provide a relatively simple and inexpensive electrical control means for such systems, making possible completely automatic operation of the trolley bucket or else hand-controlled operation thereof. Additional objects will be explained in connection with the following description of a preferred embodiment of the invention.

In the accompanying drawings forming a part of this specification,—

Fig. 1 is a part of a wiring diagram for alternating current, showing some of the connections and apparatus by which the improved results are obtained;

Fig. 2 is the remainder of the alternating current wiring diagram;

Figs. 3 and 4 are respectively like Figs. 1 and 2, but showing together a direct current diagram;

Fig. 8 is a top plan view of the installation of Fig. 5, the machinery house being shown in horizontal section;

Fig. 9 is an elevation, on an enlarged scale, of the push button control panel;

Of recent years, trolley bucket systems have been installed in materials-handling plants because of their flexibility and adaptability, the large economies realized by them, particularly in dispensing with labor, and because they make possible the use of tall storage bins, thus economizing in land area, and making possible a lower capital investment per ton of materials stored. Other advantages of trolley bucket plants as compared with open pit plants operated by hand labor are greater safety of operation; less degradation and breakage of lump material; protection from the weather and hence low cost all year handling of materials; rapidity of truck loading for retail delivery; and freedom from mixing different materials such as sand and coal.

The present invention provides, in a trolley bucket installation having all the above mentioned and other advantages, electrical control apparatus which makes possible completely automatic operation of the bucket or semi-automatic operation. The invention provides numerous safety devices and other improvements insuring absolutely perfect operation and control of the bucket, and attaining results which are impossible in known operator-controlled trolley bucket installations.

Figure 5:
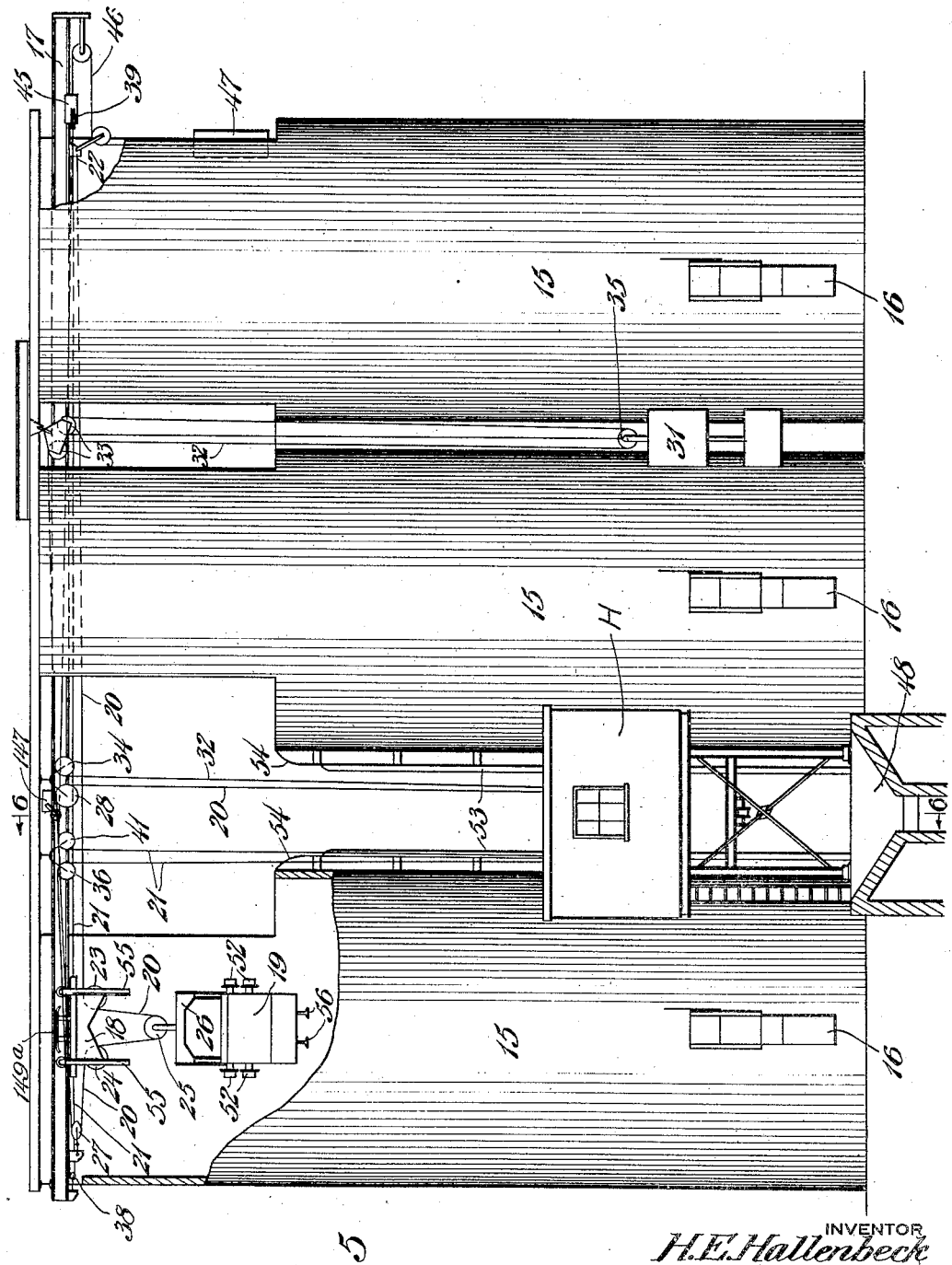
Fig. 5 is a front elevation, with parts in section, of a typical trolley bucket installation.
Figure 6:
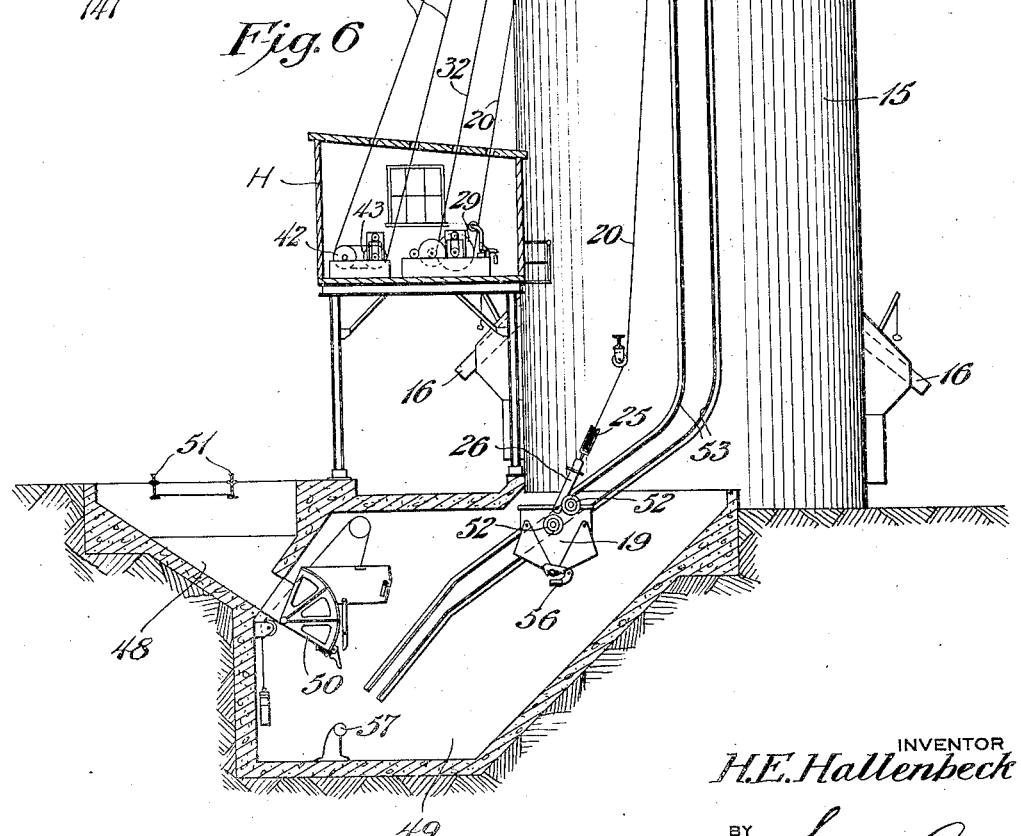
Fig. 6 is a vertical section on line 6—6 of Fig. 5, but showing the bucket down in the loading pit.

Referring particularly to the drawings, and first to Figs. 5, 6, and 8, there is shown, for simplicity of illustration, a small materials-handling plant, having a series of storage bins or silos 15, discharge chutes 16 leading from each bin to permit gravity loading of trucks, an elevated track or monorail 17 extending over the bins, a trolley 18 which travels along the track, a bucket 19 suspended from the trolley by means of a hoist line 20, and a trolley or traverse line 21 secured to the trolley to effect horizontal movement of the bucket beneath the track. One end of the hoist line 20 is dead-ended as at 22 (Fig. 5), and it passes over sheave 23 journaled on the trolley and under sheave 25 mounted on bail 26 of the bucket, thence over sheave 24 on the trolley around guiding sheaves 27, 28 and down to a hoist drum 29 (Fig. 6) which is driven by a direct-geared motor 30, either alternating or direct current. To counteract the tendency of the bucket (whether loaded or empty) to spin the hoist drum around, a counterweight 31 (Figs. 5 and 8) is supported by a line 32 guided by sheaves 33, 34 and leading to the hoist drum but wrapped about said drum in a direction which is the reverse of the direction in which hoist line 20 is wrapped. Line 32 is dead-ended as at 35 (Fig. 5).

The ends of the trolley or traverse line 21 are secured to the opposite ends of the trolley, and as shown in Figs. 5 and 8, the line is guided by sheaves 36, 37, 38, 39, 40, and 41 and extends down to and around a trolley drum 42 and also an idler drum 43 (Fig. 6). The trolley drum is directly driven by a motor 44 (either alternating current or direct current) whose controlling mechanisms will be described hereinafter. To keep the trolley line relatively taut and yet permit a momentary yielding, a carriage 45 (Fig. 5) is mounted on the monorail and is connected by a rope 46 with a counterweight 47, as disclosed in the Harding Patent No. 1,631,030 dated May 31, 1927. Both trolley and hoist motors, together with their control mechanisms, are shown housed in a machinery house H, which affords protection against the weather.

As the two bucket-controlling lines are independently operated, it will be clear that the bucket may be raised and lowered at any point desired, and may be moved to the right or left at any elevation beneath the track for practically the full length thereof, except for interference with the walls of the bins. Thus the system is adaptable to an infinite number of arrangements of the bins etc.

The bucket is loaded by gravity from a hopper 48 elevated with respect to the bucket when in loading position. This hopper may be like the one shown in Patent No. 1,720,704 and may be above a pit 49, as in the illustrative plant, or it may be above the surface of the ground. In either case control of the discharge from the hopper to the bucket is had by means of a pivoted gate 50 (Fig. 6) which is shown as being similar to the one disclosed in my Patent No. 1,808,953 assigned to the assignee of this application. The bucket itself is more fully disclosed in the Bennett Patent No. 1,741,123 dated Dec. 24, 1929. The material being handled is dumped from a car (not shown) on a railroad siding 51 (Fig. 8) into the hopper 48, and flows by gravity into the bucket until the latter is filled, when the flow automatically stops. Then the bucket is hoisted, thus closing the gate 50.

To guide the bucket as it is hoisted, it has pairs of rollers 52 on its opposite sides, each pair engaging between spaced guides or rails 53 extending down in the pit 49 and upwardly to a point near the tops of the bins. At the upper ends of rails 53, there is preferably a bucket guiding and straightening structure 54 (Fig. 6) which insures the proper engagement of the bucket rollers with the rails as the bucket is lowered from the monorail. The structure 54 is fully disclosed in Patent No. 1,808,954, dated June 9, 1931.

When the bucket is hoisted as far as the trolley, its bail 26 engages a spring buffer 55 (Figs. 5 and 6) described in the patent to Towne No. 2,004,451, assigned to the assignee of this case, or else the upper edge of the bucket engages a structure depending from the trolley, as disclosed in Patent No. 1,848,009 dated March 1, 1932. In either case, the bucket is stabilized, i. e., it does not swing through a wide arc because of its inertia each time the trolley starts up, or because of its momentum each time the trolley is stopped. Such swinging as is induced by changes in velocity of the trolley is immediately checked by the springs of the spring buffer 55.

When the bucket is brought over the bin or pile of material in or on which its contents are to be dumped, it is lowered until its trip pads 56 (Fig. 5) come in contact with the material, whereupon the bottom opens and the contents flow out by gravity. The bucket is then immediately returned to the loading point. It is lowered preferably with the bottom still open, and closing is effected by contact of the swinging bottom closure or jaw with an abutment 57 (Fig. 6) below the gate 49, as described and claimed in the aforesaid Bennett patent. The gate is opened by a latch mechanism, as disclosed in my Patent No. 1,808,953 dated June 9, 1931; but it may be opened automatically by various mechanisms, for example, a motor with proper limit switches (not shown) or it may be opened by contact with the bucket itself, as is known to the art of skip hoists. When the bucket is filled, and the hoist line begins to pull it up the guides 53, the gate is closed to prevent flow of material into the pit.

The cycle of the bucket, starting from the moment of loading, comprises, first, hoisting to the trolley, then a traverse of the trolley either to the right or left as viewed in Fig. 5, then stopping of the trolley, then lowering of the bucket to the point of discharge, then dumping, then hoisting of the bucket to the trolley, then traverse of the trolley in the opposite direction to a point above the guides 53, stopping the trolley, lowering the bucket to the filling point and holding the bucket stationary at that point until full. Obviously, then, there are two hoisting phases, one with the bucket full, and the other with the bucket empty, two lowering phases, one with the bucket full and the other with it empty, and two traverse phases, one with the bucket full and the other with it empty. Furthermore, each time the bucket is moved, whether hoisted or lowered or moved with the traverse of the trolley, there must be an acceleration of a heavy but very variable mass followed by a deceleration and stoppage thereof. The operation must be quick to be economical, yet must be smooth lest undue strain be imposed on the cables, cable connectors, sheaves, bearings, monorail supports, and other parts of the plant. Furthermore, all possibility of damage to the bucket and trolley must be eliminated. These facts and others known to those skilled in the operation of trolley bucket systems make the desideratum of an automatic control of a trolley bucket an extremely difficult problem, which prior to the present invention, has never been solved.

Referring now to Figs. 1 and 2, which show in diagram electrical control apparatus for three phase alternating current, there are the usual power lines or mains L1, L2 and L3 which are connected to or disconnected from the control circuits by a master switch 60. The control circuits are respectively for the hoist motor 30 and the traverse motor 44, and sets of fuses 61, 62 protect the two control circuits against surges on the mains.

Considering first the hoist control circuit, there is shown a pair of mechanically interlocked magnetic contactors, the contactor 63 instituting hoisting of the bucket and contactor 64 starting downward movement of the same, both contactors being connected with two of the three conductors 65, as shown, so that reversing of the hoist motor 30 is effected by alternate closing of the contactors. These contactors are also connected, through conductors 66, with a thermal overload relay 67, which protects the motor in case of an excessive load continuing beyond a certain time interval. Conductors 68 connect the thermal overload relay with the hoist motor 30 (Fig. 2). A motor-mounted solenoid brake having a brake coil 69 effects automatic stoppage of the hoist motor whenever the current through conductors 68 is cut off, thus stopping the bucket.

To effect automatic acceleration of the hoist motor so as to minimize strain on the several elements which control the elevation of the bucket, and also to permit a net increase in the speed of hoisting and lowering beyond what is safely possible should the motor be thrown directly on the line, an accelerating resistor 70 is connected to the hoist motor by conductors 71. As shown in Fig. 1, two accelerating resistor contactors 72, 73 are connected by conductors 74, 75 respectively with the accelerating resistor 70, these contactors automatically cutting out resistances built in the resistor (not shown) to accelerate the hoist motor, after contactor 63 or 64 closes. As shown, the resistor contactor 72 is in open position, in which all the resistance of the resistor is in series with the secondary circuit of the hoist motor; but as soon as contactor 72 closes, part of the resistance is cut out. A magnetic timing relay switch 76, having a coil 77, after a predetermined interval, is actuated to close an auxiliary circuit comprising wires 78 and coil 79 of the second resistor contactor 73, which closes to cut out the rest of the resistance and permit full speed operation of the hoist motor. A conductor 80 connects the relay 76 with timing relays 81 and 82, both with time delay elements, relay 81 being actuated by an auxiliary contactor 83 which closes with the lowering contactor 64, and relay 82 being actuated by auxiliary contactor 84 which closes with the hoisting contactor 63. Thus with the closing of either main contactor (63 or 64), a time delay element holds the full resistance of the resistor in circuit momentarily, then part of the resistance is cut out and another time delay element holds the remainder of the resistance in circuit for a second or two, and finally all the resistance is cut out and the bucket moves at high speed. Preferably the momentary delay which occurs before relay 82 permits contactor 72 to open, permits the slack to be taken out of the hoist rope, in the hoisting operation.

The described automatic control of the acceleration takes place in both directions of rotation, so that there is a smooth, joltless start of the bucket when being lowered as well as when hoisted. The increase in speed of hoisting which is made possible by the resistor effects a considerable saving, because considerably more material may be handled in the course of a day, yet the wear and tear on the bucket handling apparatus is materially diminished, with the consequences of fewer repairs and shutdowns.

Figure 10:
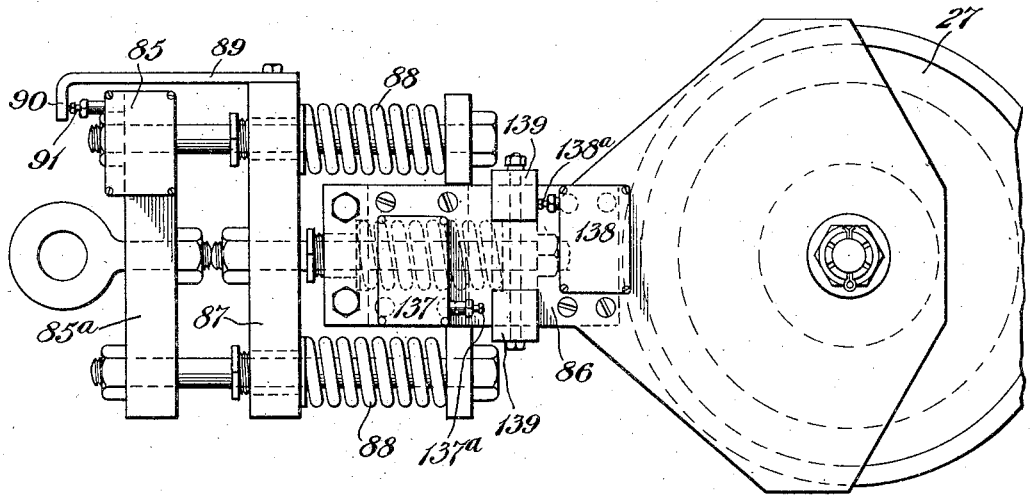
Fig. 10 is a plan view of a sheave provided with a hoist cable overload cut-out switch and with bucket return switches.

At rare intervals the hoist cable may become kinked and thus catch on a sheave block instead of passing over the sheave, or the bucket or its bail may foul on some projecting part. Any such occurrence would impose a severe strain on the hoist cable,—a strain which, if continued might break the cable and allow the bucket to drop with probable injury to the bucket and to the object struck by it. To prevent the possibility of shutdowns and delays due to overloading the hoist cable, a safety or cut out switch 85 (Fig. 2) is connected in series with the holding circuit of the coil 63ª of the hoisting contactor 63, as shown, and acts to stop the hoist motor quickly when the overload occurs. A cut out switch which was designed especially for use in the automatic control system of the present application is described and claimed in my Patent No. 1,890,539. As there disclosed, and as shown in Fig. 10 of the accompanying drawings, the switch 85 is carried on a crosstie 85ª mounted on sheave frame 86 on which sheave 27 is mounted, the hoist line 20 passing around said sheave. The preferred position of the sheave in a trolley bucket plant is shown in Figs. 5 and 8, but as shown in my abandoned application, Ser. No. 420,483, filed Jan. 13, 1930 the sheave may be positioned elsewhere, for instance, in the position of sheave 28 (Fig. 5). When an excessive tension is imposed on the hoist line, the crosshead 87 is moved in the direction of the pull against the tension of springs 88. The movement of crosshead 87 moves arm 89, whose bent end 90 pushes contact member 91 of switch 85 to open said switch.

When the hoist motor has lifted the bucket nearly to the trolley, a limit switch 92 (Fig. 2) is opened, thus opening the up contactor 63 and breaking the hoist motor circuit, so that the solenoid brake quickly stops the motor and the bucket. Limit switch 92 is one of a set of four hoist limit switches (whose functions are to be described later) all of which may be of the well known traveling nut type, but which herein are actuated by a mechanism similar to that shown in Figs. 11 and 12 and more fully disclosed in the patent to Harding No. 1,867,453, assigned to the assignee of this application. The cam which actuates switch 92 is so adjusted that it brings the bucket to a dead halt at each hoisting operation, whether from the silo or from the pit, when the bucket engages the stabilizer 55 on the trolley. The shock arising from contact between the bucket and the lower end of the stabilizer is absorbed by the stabilizer springs, so that the trolley is protected.

When the bucket is lowered, initially the lowering contactor 64 is closed. The accelerating resistor, with its timing relay control, causes an accelerated lowering of the bucket. After this acceleration, the bucket continues down at full speed until nearly at the lower limit of movement, when limit switch 94 opens, in turn opening the down contactor 64, which opens the motor circuit, thus applying the brake having coil 69 and stopping the bucket (which in the meantime has been closed) directly under the gate 50. In order to hold the bucket under the gate a sufficient length of time to permit loading, a timing relay 95 (Fig. 1) is employed, said relay being started by limit switch 96 (Fig. 2) which is closed as limit switch 94 opens. After a predetermined interval, usually about seven seconds, but varying according to the nature of the material being handled, the contacts of relay 95 close, thus closing the circuit to hoist contactor coil 63ª (with which relay 95 is connected by conductor 97), thus closing hoist contactor 63. The contactor 63 and the contacts of relay 95 are held closed by limit switch 92, which, as shown in Figs. 1 and 2, is connected to them by a wire 98. The bucket starts upward, accelerating through the resistor contactors 72, 73, after which it continues at full speed until the limit switch 92 is opened, opening contactor 63, stopping the hoisting. The fourth hoist limit switch 100 is closed at approximately the same time that limit switch 92 is opened, thus completing a circuit which makes possible the traverse motion of the trolley and bucket. But to understand how this is accomplished, the traverse side of the control mechanism must now be described.

Referring to Fig. 1, conductors 101 connect the main switch with a pair of reversing trolley contactors 102, 103, the former controlling travel to the right as the installation is viewed in Figs. 5 and 8, and the latter, reverse travel, or to the left. These contactors are mechanically interlocked (not shown), to prevent both closing at the same time. Conductors 104, and one of the conductors 101, lead to the traverse motor 44 (Fig. 2), whose function and relationship to other apparatus have been explained. The traverse or trolley motor is provided with a solenoid brake, the coil 105 of which is shown, and also with a permanent block resistor 106, which is permanently connected with the secondary circuit of the motor to increase the starting torque. However, I may use an accelerating resistor like resistor 70, with relay controlled contactors, as heretofore explained in connection with the hoist circuits.

To protect the traverse motor against continuing overloads, a thermal overload relay 107, which is like overload relay 67, is interposed between conductors 104 and the main contactor 103, breaking the motor circuit after the overload has existed for a certain length of time.

As previously stated, when the bucket is stopped at the end of the hoisting operation by opening of the limit switch 92 (Fig. 2), another limit switch 100 is closed. The purpose of this is to complete the circuit to the trolley contactor 102 through the selecting contactor 108, this being one of two contactors (the other being designated at 109) for automatically selecting the direction of traverse. By means of its time contact 110, selecting contactor 108, when closed, will insure the movement of the trolley to the right, as viewed in Fig. 5, when the loaded bucket comes up from the pit, while by means of its time contact 111, selecting contactor 109 will insure movement of the trolley to the left. It will be observed that time contact 110 is connected with the coil of the main contactor 102 by a wire 112 while time contact 111 is connected to the coil of main contactor 103 by a wire 113. Thus the coils of these trolley contactors cannot be excited to close the contactors until their circuits are completed through the time contacts and the wires 112, 113.

When the trolley contactor 102 closes, its auxiliary contact 102ᵇ closes, thus completing a circuit through wires 102ᶜ, 102ᵈ to the traverse brake contactor to be described, and this energizes brake coil 105 to release the brake of the trolley motor. The trolley, with the loaded bucket immediately below it, starts to the right, as viewed in Fig. 5, and continues its traverse until a limit switch 114 (Fig. 2) opens. This opens the selecting contactor 108, with which limit switch 114 is connected by a wire 115, and the opening of selecting contactor 108 opens main trolley contactor 102, cutting off the power to the traverse motor.

It has been found highly desirable to permit the trolley to coast for a short time before the brake is applied to the motor to stop the trolley. This coasting effects a deceleration in the trolley, thus making it easier for the brake to bring the trolley to a dead stop, and minimizes swinging of the bucket in the vertical plane of the trolley when the trolley is finally stopped. Thus there is a much smoother operation, with less wear and tear, and also there is a saving in power, when the trolley coasts before stopping. In actual practice, this coasting may last one second or longer, depending on the speed of the trolley, the capacity of the bucket, the length of the monorail and other variables. After this coasting interval, the limit switch 116 (Fig. 2) opens, thus opening the brake contact 117 (Fig. 1) which permits the traverse brake 105 to be applied.

There is a conductor 118 connecting the main line with the brake coil 105 through brake contactor 117. The magnetic coil 119, which, when energized, closes the brake contactor 117, is connected by a conductor 120 and an auxiliary contactor 121 with a limit switch 122 in series with limit switch 116 (Fig. 2). Limit switch 122 is, however, closed when limit switch 116 is opened, as will be more fully disclosed hereinafter, and hence the opening of limit switch 116 is effective to control the brake contactor 117.

Figure 11:
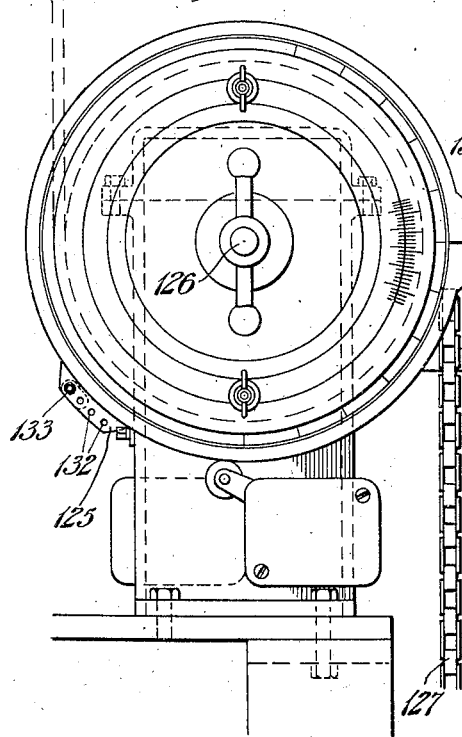
Fig. 11 is a front elevation and Fig. 12 is a side elevation of the limit switch actuating mechanism governing the traverse of the bucket.
Figure 12:
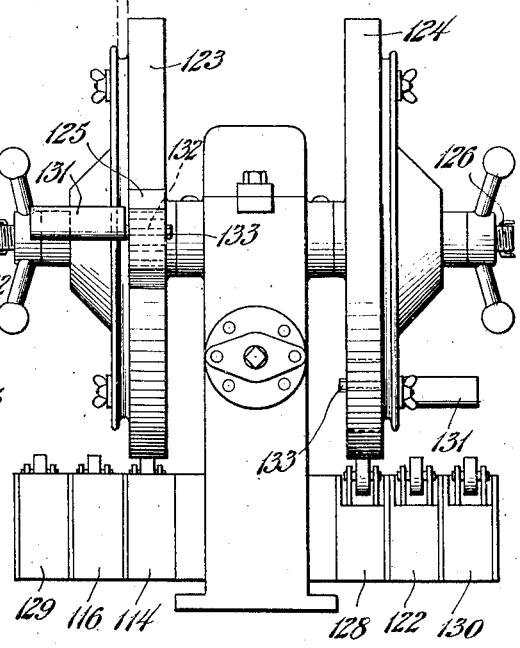

Referring to Figs. 11 and 12, which illustrate the preferred form of actuating means for the six traverse switches shown in Fig. 2, there are two cam disks 123, 124 having cams 125 on their peripheries, said disks being slowly driven by a common shaft 126 which in turn is driven by a sprocket chain 127 (through a reduction gearing, not shown), said sprocket chain being connected with the idler drum 43 (Fig. 8) of the traverse unit. The particular construction of this actuating means for the traverse limit switches is fully disclosed in the aforesaid patent of H. V. Harding, No. 1,867,453. The limit switches 114, 116, 122, 128, 129, and 130 are placed adjacent the disks 123, 124, with switches 114 and 128 having their actuating arms in the planes of the respective disks, so that the cams 125 will depress the actuating arms, thereby opening the control circuits governed by the limit switches. The disks are adjusted to suit the particular installation with which they are used, and are driven by a reduction gearing of such ratio that the disks are rotated less than one full revolution during the entire traverse of the trolley. Each cam 125 governs traverse movement of the trolley in one direction only, the two disks rotating in opposite directions as the trolley travels in opposite directions. Obviously, by adjusting the angular positions of the cams 125 it is possible to govern the traverse of the trolley in both directions and to adjust for a short traverse or a long traverse; hence to bring the bucket to a stop directly over any one of a series of bins or piles of material.

As previously stated, limit switch 114 merely effects cutting off of power to the traverse motor (the same being true of the corresponding switch 128); stoppage is not effected until the brake contactor 117, which is governed by limit switch 116, breaks the circuit of the brake coil 105. To open limit switch 116, and the corresponding limit switch 122, there are two cam arms 131 secured to the disks 123, 124 adjacent their peripheries and extending substantially at right angles to the flat faces of the disks or parallel to the shaft 126. These cam arms may have pins at their ends inserted in one of a series of holes 132 drilled in the sides of the cams 125 and secured as by nuts 133. Each cam arm 131 depresses the actuating arms of two limit switches 116, 129 or 122, 130, as the case may be. Switch 116 is opened preferably about one second after switch 114 is opened, thus permitting a period of about one second in which the trolley and bucket coast with the power cut off. So too, when the trolley and bucket are traveling in the opposite direction, switch 122 is opened about one second after switch 128, thus permitting the same interval of coasting. Limit switches 114 and 128 thus institute coasting, while actual stopping is effected by switches 116 and 122. As will be explained, switches 129 and 130 govern the operation of the direction-selecting contactors 109, 108 respectively.

In the above description of the arrangement and operation of the parts, the hoisting and lowering of the bucket between the monorail and pit have been explained, also the traverse toward the right for a predetermined distance, followed by a brief period of coasting, and finally the application of the traverse motor brake. The trolley is now directly over the point where the bucket is to be lowered to dump its load. Before starting the lowering operation, a slight pause should occur, to insure a stationary bucket. When the trolley stops, even after a period of coasting, the bucket tends to go on, because of its momentum, and hence its sheave 25 tends to climb the hoist line 20, by which the bucket is suspended. This tendency of the bucket to swing on the hoist line much like a short pendulum is strongly resisted by the powerful springs of the stabilizer 55, as fully explained in the aforesaid Towne application. The stabilizer cannot act instantaneously, however, and a brief interval must be allowed for the bucket to become still before lowering may begin, because if a swinging bucket were lowered, it might be dashed against the bin or some other obstacle as the "pendulum" lengthened. The present invention provides means for effecting a brief pause before lowering begins.

As previously explained, limit switch 129 is actuated with limit switch 116 governing the traverse brake. However, limit switch 129 is closed when switch 116 is opened, and this closing effects closing of selecting contactor 109, there being a conductor 134 connecting switch 129 with said selecting contactor as shown in Figs. 1 and 2. Thus the way is prepared for return traverse movement of the bucket before the bucket has descended to dump its load. The opening of brake contactor 117, which follows immediately after opening of switch 116, closes a contactor 135 (Fig. 1) which has a time element contact. When this time contact closes, after an interval of two or three seconds, the lowering contactor 64 is closed, due to the conductor 136, and the hoist motor starts lowering the bucket (with automatic acceleration as previously described) until its trip pads strike the pile of material or the bottom of the bin or the ground. When some of the weight of the bucket is taken off the hoist cable, a bucket return device, to be described, will operate, to effect a reversal of the motor with consequent hoisting of the bucket. This reversal of the hoist motor may take place rapidly with an alternating current motor of a known type, without the least injury, and is much to be desired, not only to save time, but also to obviate trouble arising from a slack cable, as more fully explained in my Patent No. 1,890,539.

Referring to Fig. 2, two switches 137, 138 are shown diagrammatically, with connections such that switch 137 controls lowering of the bucket and switch 138 controls hoisting, as will be explained. The switches 137, 138 are preferably on the sheave frame 86 (Fig. 10) and the arrangement is such that when the hoist line slackens somewhat, the sheave frame moves relative to crosshead 139 so that the latter strikes the contact element 138ª of switch 138 to close said switch, while switch 137 is allowed to open, because of its movement away from crosshead 139. The opening of limit switch 137 opens the lowering contactor 64, while the closing of switch 138 closes the hoisting contactor 63, thus stopping the downward movement of the bucket and starting the upward movement. When the bucket again reaches the trolley, the limit switch 92 of the hoist unit opens, opening the hoisting contactor 63, which effects braking of the hoist motor and stoppage of the bucket.

With the bucket stopped at the upper limit of its travel, the limit switch 100 on the hoist unit then closes, closing the trolley contactor 103 through the selecting contactor 109, which was closed in a previous operation, as explained above. The bucket now travels to the left, as viewed in Fig. 5, until the limit switch 128 (Fig. 2) on the traverse unit opens the trolley contactor 103, permitting coasting for about one second, followed by opening of limit switch 122 (Fig. 2) which opens the brake contactor 117, causing the brake to stop the traverse motor and hence the bucket. Traverse to the left ceases, and there is a predetermined pause, with the bucket above the bucket straightening device 54 (Figs. 5 and 6) before the bucket is lowered. When limit switch 122 opens, limit switch 130 closes, thus closing the selecting contactor 108, and thereby preparing for the next traverse of the bucket, which will ordinarily be to the right. The opening of brake contactor 117 again closes timing relay 135, which after the predetermined interval of two or three seconds closes the down contactor 64, so that the bucket is lowered down the guides 53, being automatically accelerated and finally brought to a stop, as previously explained, to take on another load.

Figure 7:
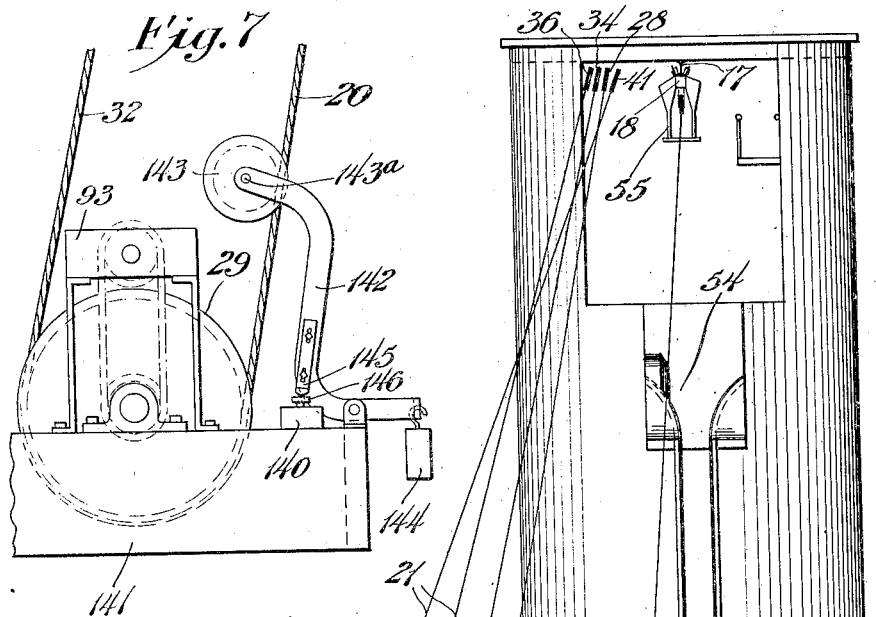
Fig. 7 is an elevation, on an enlarged scale, of the slack cable limit switch and its actuating means.

Referring to Fig. 7, there is shown a slack cable device actuated when considerable slack occurs in the hoist cable to open a switch 140 to cut off the power to the hoist motor. The connections of switch 140 are shown in Fig. 2, said switch being in series with the hoist limit switch 94, which, as explained, opens the lowering contactor 64, thus opening the circuit of the hoist motor. The purpose of switch 140 is to make impossible an excessive amount of slack hoist cable, which is likely to foul on various objects, and be broken when drawn taut, thus letting the bucket fall and shutting down the entire plant. The bucket return device shown in Fig. 10 acts to prevent slack when the bucket is down in bin or on top of a pile but is rendered inoperative, by means to be described, when the bucket is in the pit, as it is then desirable that the hoist cable be sufficiently slack to let the bail of the bucket swing down out of the way of the gate chute. See Fig. 6. The slack cable device of Fig. 7 is a safety device, operating independently of the remainder of the mechanism to stop the hoist motor should excessive slack accumulate in the hoist cable; and it is described and claimed in Patent No. 1,848,972 dated March 8, 1932.

Referring to Figs. 6 and 7, the hoist drum 29 has a base 141, and pivoted on said base is a frame 142 carrying a sheave 143 at its upper end, a counterweight 144 on the other end of frame 142 holding the sheave in engagement with the hoist line 20. If the hoist line slackens, the counterweight swings frame 142 clockwise, as viewed in Fig. 7, thus raising an adjustable angle piece 145 which normally presses down on a spring-pressed plunger 146 which operates switch 140. When the plunger 146 is allowed to move upwardly, responsive to its spring (not shown), switch 140 opens the circuit of the hoist motor. A moderately taut hoist line will, however, maintain switch 140 closed because of the position in which frame 142 is held. The sheave 143 is always maintained in contact with the hoist line by the unbalanced weight of frame 142 and it travels back and forth along shaft 143ᵃ as the hoist line is wound upon or unwound from the drum 29.

The aforementioned means to render the bucket return device inoperative while the bucket is in the pit is shown diagrammatically in Fig. 2. A switch 147 is connected by conductors 148 with the limit switches 137, 138 and has an operating arm 149 with a roller 150 on its free end. The switch 147 is placed on or adjacent to the monorail in the path of a tripper 149ᵃ on the trolley (Fig. 5) and is located above the bucket guides 53 so that while the trolley is in position to lower the bucket upon the guides, the tripper 149ᵃ engages roller 150, thus holding switch 147 in position to cut out switches 137, 138.

To prevent lowering of the bucket while either traversing contactor 102, 103 is closed, and to prevent traversing of the bucket while either the up or down contactor is closed, electrical interlocks are provided. Referring to Fig. 1, the traverse contactors have auxiliary contacts 151, 152, which are connected in series with wire 153 leading from down contactor coil 64ᵃ. The auxiliary contacts 151, 152 each open when the corresponding traverse contactor closes, and each closes upon opening of the corresponding traverse contactor. The object of this apparatus is to prevent the down contactor coil from being energized as long as either traverse contactor is closed. In the same manner, auxiliary contacts 154, 155 are connected in series with wire 156 leading from both traverse contactor coils 102ᵃ, 103ᵃ, thus preventing either traverse contactor from closing as long as either contactor 63, 64 is closed. Auxiliary contact 154 also prevents the down contactor 64 from closing while the up contactor 63 is closed.

One of the objects of the invention is to provide a control for electrically driven trolley buckets which may be either completely automatic or under the direct control of the operator, and a more specific object is to provide very simple means to change from automatic to hand operation and back again. The preferred form of control panel 157 is shown in Fig. 9 and comprises six push buttons 158–163 and two toggle switches 164, 165. The wiring and connections for the several switches are shown in Fig. 2. When the switch 165 is at "run" position, the apparatus will operate, but when it is at "safe" position, nothing will move, however the apparatus is handled. When the switch 164 is moved toward the position designated by the word "hand", control of the bucket is effected by pressing the switches 158–163 in the order necessary to move the bucket where desired. The operator may thus effect step-by-step operation of the bucket, which continues its travel until stopped by traverse stop switch 160 or hoist stop switch 163 or by one of the safety switches. It is thus necessary to press one of the buttons 158–163 for each hoisting, lowering and traversing operation. But when the switch 164 is moved to the "automatic" position, the bucket operates automatically and continuously without any further attention whatever.

The above described embodiment of the invention can be employed only when the source of power is three phase alternating current, which, however, is almost universally available throughout the United States. In some of the older industrial centers, direct current electric power is supplied in certain restricted localities to the exclusion of alternating current. Hence it has been found necessary to devise a direct current control system functionally the equivalent of the alternating current control system of Figs. 1 and 2. A direct current diagram embodying my invention is clearly shown in Figs. 3 and 4, which correspond to Figs. 1 and 2, respectively.

In Fig. 3, there is shown a main line 200, a feeding switch 201, and fuses 202 and 203 protecting the motor circuits including conductors 204. There is also a main line contactor 205 which carries the auxiliary contacts 206 and 207. This contactor is used in connection with the reversing hoist contactors to be described and operates simultaneously with either contactor, its function being to break the main line circuit on the line side of the reversing contactors.

The hoisting and lowering of the bucket is controlled through four single pole contactors, the contactors 208 and 209 controlling the hoisting movement and the contactors 210 and 211 controlling the lowering movement. Each of the main contactors 208-211 has two auxiliary contacts as shown, these being designated by the same reference numerals with the letters a and b added. In order to provide for an acceleration of the bucket both in hoisting and lowering, there are two accelerating relays 212, 213 which control the time intervals of the closing of the two accelerating contactors 214, 215, respectively, which cut in or cut out all of the resistor R.

In stopping the direct current motor, countervoltage is set up, as is well known. In order to prevent reversing of the hoist motor before its countervoltage dies down, a time relay 216 is provided. The timing relay for holding the bucket in the pit while taking on a load is shown at 217 and its auxiliary contacts at 217a and 217b. The time relay for controlling the interval during which the bucket is held stationary before lowering is shown at 218.

The traverse motor is controlled by two double pole contactors 219, 220, each having three auxiliary contacts 219ᵃ, 219ᵇ, 219ᶜ and 220ᵃ, 220ᵇ, 220ᶜ. The selecting contactors for controlling the direction of traverse are shown at 221 and 222. Each has three auxiliary contacts, as shown. To accelerate the traverse motor, there is an accelerating contactor 223 and an accelerating relay 224, a resistor R' being cut in by the contactor 223 when the traverse motor starts and being automatically cut out after a predetermined interval through the action of the relay 224. A traverse brake contactor 225 with auxiliary contacts 225ᵃ, 225ᵇ is also provided to control the setting of the traverse brake which occurs after an interval of coasting, as previously explained. Overload protection to the motors and other parts of the apparatus is afforded through overload relays 226, 227 as well as the fuses 202 and 203.

Cooperating with the solenoid brake for the hoist motor is a dynamic brake resistor R2 which is cut in and cut out by means of auxiliary contact 207 on the main line contactor 205. The resistor R2 is short-circuited across the armature of the hoist motor whenever the line contactor opens, and stops the motor very quickly, greatly augmenting the braking action.

Referring now to Fig. 4, it is seen that the apparatus shown is much the same as the parts illustrated in Fig. 2 and hence very little additional description is necessary, particularly in view of the explanatory legends in the figure. The operating panel is arranged as in Fig. 2 and the various limit switches, as well as the cut-out switch and hoist cable overload switch perform the same functions in the same way as the parts described in the alternating system.

While I have shown diagrams suitable only for three phase alternating current and for direct current, it is within the scope of my invention to wire the apparatus for operating and controlling the trolley bucket so as to operate on single phase or two phase alternating current.

The described apparatus makes it possible for a single operator to initiate automatic operation of a trolley bucket plant and thereafter to attend to other duties, if he desires. All major and most minor operating troubles are eliminated by the apparatus described in this application. The invention provides an automatic trolley bucket system which has been proved to be highly reliable and smooth in operation.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. An electrical control system for traversing hoists having a material carrier comprising, in combination, a hoist motor; a slowly driven hoist limit switch actuator; a traverse motor; a slowly driven traverse limit switch actuator; primary circuits for the hoist and traverse motors; a switch for controlling automatic operation; a set of six limit switches operated by the traverse limit switch actuator, two of which control the limits of the traverse motion, two of which control a slowing down of the traverse motor before the limits of the traverse motion in either direction are reached, and the remaining two of which control the selecting of the direction of traverse; a set of four limit switches operated by the hoist limit switch actuator, two of which control the limits of hoisting and lowering, one of which controls the period of rest while the material carrier is loaded, and one of which interlocks electrically the traverse and hoisting motions, so that traversing cannot begin until the hoisting limit has been reached; electromagnetic contactors and control circuits controlled by and connected with said sets of limit switches also connected to said motors, so that the hoisting, lowering, stopping and traversing are controlled entirely automatically, once said automatic control switch has been closed.

2. An electrical control system for traversing hoists having a material carrier comprising, in combination, a hoist motor; a traverse motor; a hoist motor circuit; a traverse motor circuit; a set of four limit switches for governing the traverse motion, two of which control the limits of traverse, the other two controlling the selection of the direction of traverse; a set of four limit switches for governing the hoist and lowering motions, two of which control the limits of movement, one of which controls the period of rest while the material carrier is loaded, and one of which interlocks electrically the traverse and hoisting motions, so that traversing cannot begin until the hoisting limit has been reached; electro-magnetic contactors and control circuits controlled by and connected with said sets of limit switches to control the hoisting, lowering and traversing entirely automatically, without any attention from the operator; means driven at slow speed by the hoist motor for actuating the four hoist limit switches; and means driven at slow speed by the traverse motor for actuating the four traverse limit switches.

3. An electrical control system for traversing hoists comprising, in combination, a hoist motor and circuit therefor; a traverse motor and circuit therefor; a set of switches connected in the traverse motor circuit for governing the traverse motions; a set of switches connected in the hoist motor circuit for governing the hoist and lowering motions; electromagnetic contactors and auxiliary circuits controlled thereby and connected with said sets of switches to control the hoisting, lowering and traversing entirely automatically, without any attention from the operator; a manually operable switch and a circuit controlled by said switch and so connected to the hoist and traverse circuits as to change the operation from a completely automatic one to an operator-controlled one; and manually operable switches for hand control of the system comprising a switch to stop traverse, two switches to initiate traverse respectively in opposite directions, a switch to stop hoisting, two switches to control respectively up and down movements of the material carrier; and a safety switch connected into the hoist and traverse circuits to shut off the power from all the circuits.

4. A fully automatic electrically operated trolley bucket system comprising, in combination, a bucket; a hoist rope; a trolley from which the bucket is suspended by the hoist rope; a trolley rope; means to support the trolley for the traverse; traverse and hoist motors; circuits for said motors; control circuits having more than two control switches for the traverse motor circuit; control circuits having control switches for the hoist motor circuit; means slowly driven by the traverse motor for actuating the control switches for the traverse motor; and means slowly driven by the hoist motor for actuating the control switches for the hoist motor; two of said traverse control switches being connected so as to effect coasting of the trolley in opposite directions with the power cut off prior to stopping.

5. A trolley bucket installation comprising, in combination, a hoist line; a trolley line; a trolley traversed by reciprocation of the trolley line; a dumping bucket raised and lowered from the trolley by the hoist line; a hoist line drum; a reversible electric motor for driving said hoist drum; a trolley line drum; a reversible electric motor for driving said trolley drum; and electrical control circuits for governing the two motors, said circuits having a switch which, when closed, starts the bucket through its cycle; said circuits being so connected and arranged as to effect automatically and continuously descent of the bucket for loading, then hoisting of the bucket to the trolley, then traverse of the trolley, then lowering of the bucket for discharge of its load, then hoisting of the bucket to the trolley, and then traverse of the trolley back to the point where lowering is to take place for the succeeding load; and interlocking circuits so connecting the hoist and traverse motor circuits as to make impossible traversing until hoisting is completed.

6. A trolley bucket installation comprising, in combination, a hoist line; a trolley line; a trolley traversed by reciprocation of the trolley line; a dumping bucket raised and lowered from the trolley by the hoist line; a hoist line drum; a reversible electric motor for driving said hoist drum; a trolley line drum; a reversible electric motor for driving said trolley drum; and electrical control circuits for governing the two motors, said circuits having a switch which, when closed, starts the bucket through its cycle; said circuits being so connected and arranged as to effect automatically and continuously descent of the bucket for loading, then hoisting of the bucket to the trolley, then traverse of the trolley, then lowering of the bucket for discharge of its load, then hoisting of the bucket to the trolley, and then traverse of the trolley back to the point where lowering is to take place for the succeeding load; said switch being so connected in the circuits that, when opened, automatic operation ceases; and a plurality of switches also connected in said circuits each to effect one of the specified steps of hoisting, lowering and traversing in opposite directions.

7. A trolley bucket installation comprising, in combination, a hoist line; a trolley line; a trolley traversed by reciprocation of the trolley line; a dumping bucket raised and lowered from the trolley by the hoist line; a hoist line drum; a reversible electric motor for driving said hoist line; a trolley line drum; a reversible electric motor for driving said trolley drum; and electrical control circuits for governing the two motors, said circuits having a switch which, when closed, initiates automatic and continuous operation of the bucket including descent for loading, then hoisting of the loaded bucket to the trolley, then traverse of the trolley, then lowering of the bucket for discharge of its load, then hoisting of the empty bucket to the trolley, and then traverse of the trolley back to the point where lowering is to take place for the succeeding load; said switch being so connected in the circuits that, when opened, automatic operation ceases and hand control is then permitted; a plurality of hand-operated switches also connected in said circuits each to effect one of the specified steps of hoisting, lowering and traversing in opposite directions; and a safety switch disconnecting the control circuits when in one position to stop operation and connecting them when in another position; the control circuits being so connected with the safety switch that when the operation stops, because of said safety switch, the bucket cycle is not changed and automatic operation resumes from the point at which it was stopped, when said safety switch is moved to said other position.

8. An electrical control system for trolley buckets of the gravity dumping type comprising, in combination, a hoist control circuit having a time delay element for holding the bucket in loading position for a predetermined interval; said time delay element being adjustable relative to the hoist control circuit to vary the interval allowed for loading without varying the operation of the bucket in any other part of the cycle of operation; means for hoisting the bucket and so connected as to operate only when the aforesaid time interval has elapsed; means for stopping hoisting when the bucket reaches the trolley; means for effecting traverse of the trolley after hoisting has ceased; means for stopping the traversing trolley; means for lowering the bucket after traverse has ceased; hoist-line-operated means for stopping the lowering and effecting immediate hoisting of the bucket when it reaches the point of discharge; means for effecting traverse of the trolley in the opposite direction; means for stopping the trolley prior to lowering of the bucket; and means for lowering the bucket to the point of loading.

9. An electrical control system for trolley buckets of the gravity dumping type, comprising, in combination, a hoist line for supporting the bucket; a trolley supporting said hoist line and adapted to traverse in opposite directions; a reversible motor for hoisting the bucket by means of the hoist line; means for stopping the hoist motor at the end of each hoisting operation; a reversible motor for traversing the bucket by means of the trolley at the end of each hoisting operation; hoist-line-operated means for reversing the hoist motor as soon as the loaded bucket has encountered an obstruction while lowering, thus lessening the tension in the hoist line, said reversing means acting instantaneously to prevent slackening of the hoist line; and a switch to cut out the action of said bucket-reversing means when the bucket is being lowered empty for refilling.

10. An electrical control system for trolley buckets of the gravity dumping type comprising, in combination, a reversible motor for hoisting the bucket; means for stopping the hoist motor at the end of each hoisting operation ;a reversible motor for traversing the bucket when hoisted; means for stopping the traverse motor at the end of each traverse; control circuits for the traverse motor having switches effecting cutting off the power to the traverse motor before the bucket reaches its stopping point, to permit coasting of the bucket; means for lowering as soon as traversing ceases; and means for reversing the hoist motor as soon as the bucket has encountered an obstruction while lowering, thus lessening the tension in the hoist line, said reversing means acting instantaneously to prevent slackening of the hoist line.

11. An electrical control system for trolley buckets of the gravity dumping type, comprising, in combination, a reversible motor for hoisting the bucket; automatic accelerating means connected in the hoist motor circuit and including magnetic switches acting during hoisting, and also during lowering by the reversed motor; a limit switch for stopping the hoist motor at the end of each hoisting operation; a reversible motor for traversing the bucket when hoisted; a limit switch for stopping the traverse motor at the end of each traverse; control circuits for the traverse motor having switches effecting cutting off the power to the traverse motor before the bucket reaches its stopping point, to permit coasting of the bucket; and means for reversing the hoist motor as soon as the bucket has encountered an obstruction while lowering, thus lessening the tension in the hoist line, said reversing means acting instantaneously to prevent slackening of the hoist line.

12. A trolley bucket installation comprising, in combination, a hoist drum; a hoist line wound around said drum; a reversible motor for driving said hoist drum; a traverse drum; a traverse line wound around said traverse drum; a reversible motor for driving said traverse drum; a trolley to which said traverse line is secured; a gravity dumping bucket suspended by the hoist line from the trolley; mechanism actuated by the lessening of tension on the hoist line when the bucket is lowered into contact with a pile of material to operate a switch; a circuit controlled by said switch to reverse the hoist motor and thereby to start the bucket up again; and means to cut out the action of said switch when the bucket is lowered to the loading point.

13. A trolley bucket installation comprising, in combination, a hoist drum; a hoist line wound around said drum; a reversible motor for driving said hoist drum; a traverse drum; a traverse line wound around said traverse drum; a reversible motor for driving said traverse drum; a trolley to which said traverse line is secured; a gravity dumping bucket suspended by the hoist line from the trolley; mechanism actuated by the lessening of tension on the hoist line when the bucket is lowered into contact with a pile of material to operate a switch; a circuit controlled by said switch to reverse the hoist motor and thereby to start the bucket up again; a switch located adjacent the point where the trolley stops to permit lowering of the bucket to the loading point; and a switch-operating shoe fixed to the trolley and moving said last named switch to cut out the bucket-reversing switch as long as the trolley remains at the aforesaid point.

14. In an electrical trolley bucket installation, the combination of automatic electrical means for raising, lowering and traversing the bucket through a complete operative cycle to effect loading, discharge of load, and return to the original loading point; operator-controlled means for predetermining in which one of two directions from the loading station traverse of the bucket will take place; and automatically acting means to hold the bucket at the loading point for a predetermined time interval so that loading may be completed before the hoisting is resumed.

15. In an electrical trolley bucket installation, the combination of automatic electrical means for raising, lowering and traversing the bucket through a complete operative cycle to effect loading, discharge of load, and return to the original loading point; operator-controlled means for predetermining in which one of two directions from the loading station traverse of the bucket will take place; means for effecting a pause in the operation at the end of each traverse of the bucket and before lowering the bucket, whether empty or full; and automatically acting means to hold the bucket at the loading point for a predetermined time interval so that loading may be completed before the hoisting is resumed.

16. In an electrical trolley bucket installation, the combination of automatic electrical means for raising, lowering and traversing the bucket through a complete operative cycle to effect loading, discharge of load, and return to the original loading point; operator-controlled means for selecting the direction of movement of traverse of the bucket before the bucket starts on its cycle, so that traverse in either direction, and return-traverse, are predetermined and fully automatic; and electrical interlocking circuits so connected and arranged as to prevent hoisting or lowering of the bucket while traversing takes place, and also to prevent traversing when the bucket is lowered from the trolley.

17. A trolley bucket installation comprising, in combination, a hoist motor; a hoist line; a trolley; a trolley motor; a trolley line; a bucket suspended from the trolley by the hoist line; both motors being reversible to effect movement of the bucket in opposite directions, by means of the lines; electrical circuits for the hoist and trolley motors to effect automatic operation of the bucket; and electrical interlocking circuits connecting the hoist and trolley motor circuits to prevent traversing of the bucket when lowered from the trolley and to prevent hoisting or lowering while traversing.

18. In an electric motor-operated trolley bucket installation, the combination of a bucket; a trolley; a trolley motor; a solenoid brake for the trolley motor; a trolley line for traversing the trolley in opposite directions; a hoist motor; a hoist line supported by the trolley for raising and lowering the bucket; a plurality of traverse limit switches connected in the control circuit of the trolley motor; a mechanically driven limit switch actuator having adjustment means for varying the points at which actuation of said switches takes place, in opposite directions of traverse; two of the limit switches cutting off power to the trolley motor, respectively in opposite directions of traverse; two other limit switches effecting application of the brake, respectively in opposite directions of traverse; said actuator being so constructed and arranged that when adjusted for varying travel of the bucket, the time relation of the aforesaid limit switches for cutting off power and stopping the trolley is not changed.

19. An electrical control system for automatically and continuously hoisting, traversing, lowering, hoisting, return traversing, and again lowering a bucket which is controlled by two lines, operated by two reversible motors; said system having primary and control circuits for the two motors and a switch which, when closed against certain contacts, starts automatic operation; said switch, when closed against other contacts, changing the control circuits to permit hand-controlled operation; hand-operated switches for controlling each hoisting, lowering and traversing motion of the bucket; the circuits of said switches being so connected and arranged that when the first-named switch is moved for hand-controlled operation while automatic operation is taking place, the bucket continues its traverse or its ascent or descent until said traverse or ascent or descent ends, and then comes to a full stop and remains stationary until hand operated for each distinct phase of the operating cycle, or until automatic operation is resumed by moving the first-named switch for such operation.

20. A trolley bucket installation comprising, in combination, a hoist line; a trolley line; a trolley traversed by reciprocation of the trolley line; a dumping bucket raised and lowered from the trolley by the hoist line; a hoist line drum; a reversible electric motor for driving said hoist drum; a trolley line drum; a reversible electric motor for driving said trolley drum; and electrical control circuits for governing the two motors, said circuits having a switch which, when closed, initiates automatic and continuous operation of the bucket including descent for loading, then hoisting of the loaded bucket to the trolley, then traverse of the trolley, then lowering of the bucket for discharge of its load, then hoisting of the empty bucket to the trolley, and then traverse of the trolley back to the point where lowering is to take place for the succeeding load; said switch being so connected in the circuits that, when opened, automatic operation ceases; a safety switch disconnecting the control circuits when in one position to stop operation and connecting them when in another position to permit operation; the control circuits being so connected with the safety switch that when the operation stops, because of said safety switch, the bucket cycle is not changed and automatic operation resumes from the point at which it was stopped, when said safety switch is moved to said other position; the control circuits being so arranged and actuated that retrograde traverse of the bucket cannot take place when automatic operation is resumed, and traverse in the proper direction will always take place.

21. An automatic, electrically operated trolley bucket installation of the two motor, gravity loading and discharging type comprising, in combination, primary motor circuits; control and interlocking circuits connected with the primary motor circuits; mechanically driven means to close the control circuits in the proper sequence and at the proper times to effect automatically continuous operation of the bucket from the loading point to the desired point of discharge and back again; a switch connected so as to initiate such automatic operation; a safety switch connected so as to stop all operation immediately when thrown; the switch for governing automatic operation having other contacts so connected that said switch may be moved to permit hand operation; manual control switches for effecting hoisting, lowering and traverse in either direction; the switches and control circuits being so arranged that when automatic operation is stopped because of said safety switch, and later automatic operation is desired to be resumed, said safety switch need only be thrown to running position, and the bucket will resume operation in the proper direction from the point at which it had been stopped.

22. A trolley bucket installation comprising, in combination, a hoist line; a trolley line; a trolley moved in opposite directions by the trolley line; a dumping bucket raised and lowered from the trolley by the hoist line; a hoist line drum; a reversible electric motor for driving said hoist drum; a trolley line drum; a reversible electric motor for driving said trolley drum; electrical control circuits for governing the two motors, said circuits having a switch which, when closed, permits completely automatic operation of the bucket through its entire operating cycle; said switch being so connected in the circuits that, when opened, automatic operation ceases and hand control of both motors is permitted; hand control switches in the control circuits permitting the starting of the bucket in any desired phase of its cycle and in any desired direction; the circuits being so arranged that the bucket, when started in one direction by one of the hand control switches, continues its movement in the same direction when the switch controlling automatic operation is thrown to automatic operation position, and completes its cycle in the proper sequence of operations and continuously repeats said cycle unless stopped by the operator.

23. In a two-line-controlled trolley bucket installation having reversible hoist and traverse motors for operating the lines, the combination of primary motor circuits; secondary control circuits connected with the primary circuits; mechanically actuated switches controlling the secondary circuits; interlocking circuits connecting the primary circuits so that traversing while hoisting and lowering while traversing are made impossible; adjustable means mechanically connecting the aforesaid switches respectively with the hoist and traverse motors, so that the control circuits govern the primary circuits according to a predetermined and operator-adjusted cycle, thereby to effect automatically hoisting, traversing, lowering, hoisting, return-traversing and lowering of the bucket; and a switch connected in the circuits to initiate automatic operation.

24. In a two line-controlled trolley bucket installation having reversible hoist and traverse motors for operating the lines, the combination of primary motor circuits; secondary control circuits connected with the primary circuits; mechanically actuated switches controlling the secondary circuits; interlocking circuits connecting the primary circuits so that traversing while hoisting and lowering while traversing are made impossible; adjustable means mechanically connecting the aforesaid switches respectively with the hoist and traverse motors, so that the control circuits govern the primary circuits according to a predetermined and operator-adjusted cycle, thereby to effect automatically hoisting, traversing, lowering, hoisting, return-traversing and lowering of the bucket; and a switch connected in the circuits to initiate automatic operation, said switch having contacts so connected that when it is moved to close them, hand operation of the bucket is permitted; a series of switches connected in the control circuits to govern manually traverse, hoisting and lowering of the bucket; and a safety switch connected in the circuits so that when moved one way, all operation immediately ceases, and when moved another way either hand or automatic operation is permitted.

25. In a two line-controlled trolley bucket installation having reversible hoist and traverse motors for operating the lines, the combination of primary motor circuits; secondary control circuits connected with the primary circuits for automatic operation of the trolley bucket; interlocking circuits connecting the primary circuits so that traversing while hoisting and lowering while traversing are made impossible; adjustable means forming a part of the control circuits to effect a stopping of the bucket at the end of one lowering operation; manually adjustable means to vary the time interval during which the bucket is at rest while at the end of said lowering operation; switch means connected into the control circuits and effecting stopping of the other lowering operation, followed by instantaneous reversal of the hoist motor; and a switch connected in the circuits to initiate automatic operation.

26. In a two line-controlled trolley bucket installation having reversible hoist and traverse motors for operating the lines, the combination of primary motor circuits; secondary control circuits connected with the primary circuits for automatic operation of the trolley bucket; interlocking circuits connecting the primary circuits so that traversing while hoisting and lowering while traversing are made impossible; adjustable means forming a part of the control circuits to effect a stopping of the bucket at the end of one lowering operation; a time relay connected in with the control circuits and having an adjustable member to effect closing of the relay only after a predetermined time interval, whereby to effect a delay, with the bucket at rest at the end of said lowering operation, to permit complete gravity loading of the bucket; switch means connected into the control circuits and effecting stopping of the other lowering operation, followed by instantaneous reversal of the hoist motor; and a switch connected in the circuits to initiate automatic operation.

27. In combination with a trolley, and a trolley line for traversing the trolley in opposite directions along a track; a trolley drum for driving the trolley line; a reversible motor driving the trolley drum; a motor circuit; switch-actuating means mechanically driven at slow speed by the trolley motor; limit switches connected in the motor circuit; members carried by a movable part of said switch-actuating means and each being adjustable in position with respect to said movable part, and engageable with said limit switches to stop traverse of the trolley in opposite directions; the amount of traverse being varied by the adjusted positions of said members; and direction-selecting switches and circuits connecting them with the traverse motor circuit, said direction-selecting switch being adjacent to the limit switches and being actuated by the same members which actuate said limit switches.

28. In combination with a trolley, and a trolley line for traversing the trolley in opposite directions along a track; a trolley drum for driving the trolley line; a reversible motor driving the trolley drum; a motor circuit; switch-actuating means mechanically driven at slow speed by the trolley motor; limit switches connected in the motor circuit; members carried by a movable part of said switch-actuating means and each being adjustable in position with respect to said movable part, and engageable with said limit switches to stop traverse of the trolley in opposite directions; the amount of traverse being varied by the adjusted positions of said members; direction-selecting switches and circuits connecting them with the motor circuit, said direction-selecting switches being actuated by the switch-actuating means; the circuits connecting the direction-selecting switches and the limit switches with the motor circuits being so connected and interlocked that the setting of the aforesaid adjustable members to effect traverse of the trolley in either direction from a fixed point to a predetermined point on the track also adjusts the setting for the direction-selecting switches so that the proper direction of traverse from the fixed point is determined.

29. A traversing hoist comprising, in combination, a trolley; a track along which the trolley moves; a material carrier suspended from the trolley by a hoist line; a hoist drum and a motor driving said drum; a trolley line; a trolley drum for driving the trolley line; a reversible motor driving the trolley drum; primary and control circuits for the two motors; switch-actuating means mechanically driven at slow speed by the trolley motor; limit switches connected in the trolley motor circuit; members carried by a movable part of said switch-actuating means and each being adjustable in position with respect to said movable part, and engageable with said limit switches to stop traverse of the trolley in opposite directions; the amount of traverse being varied by the adjusted positions of said members; direction-selecting switches and circuits connecting them with the traverse motor circuit; said direction-selecting switches being actuated by the aforesaid switch-actuating means; the circuits connecting the direction-selecting switches and the limit switches with the motor circuits being so connected and interlocked that the setting of the aforesaid adjustable members to effect traverse of the trolley in either direction from a fixed point to a predetermined point on the track also adjusts the setting for the direction-selecting switches so that the proper direction of traverse from the fixed point is determined; and an interlocking circuit preventing return movement of the trolley after stopping and after the proper direction-selecting switch has been closed, until lowering and hoisting of the material carrier have taken place.

30. A traversing hoist comprising, in combination, a trolley; a track along which the trolley moves; a material carrier suspended from the trolley by a hoist line; a hoist drum and a motor driving said drum; a trolley line; a trolley drum for driving the trolley line; a reversible motor driving the trolley drum; primary and control circuits for the two motors; direction-selecting switches and circuits connecting them with the traverse motor circuit; a pair of adjustable time relays connected to the primary circuit of the trolley motor and arranged so that the trolley motor cannot start rotation in either direction until one or the other of said time relays has closed, thus effecting a delay for a predetermined and adjustable time interval before traversing in either direction begins after each hoisting operation; and an interlocking circuit preventing return movement of the trolley after stopping and after the proper direction-selecting switch has been closed, until lowering and hoisting of the material carrier have taken place.

31. A traversing hoist installation comprising, in combination, a reversible trolley motor; a reversible hoist motor; a trolley drum driven by the trolley motor; a trolley rope movable in opposite directions by said drum; a hoist drum driven by the hoist motor; a hoist rope wound in and paid out by said hoist drum; a trolley moved in opposite directions by said trolley rope; a bucket suspended from the trolley by the hoist rope; said bucket being open at the top for gravity loading and being discharged by gravity; primary motor circuits; control circuits for governing the primary circuits; interlocking circuits to prevent traversing while hoisting or while traversing; and a series of manually controlled switches connected in the control circuits for initiating the various steps of the bucket cycle, there being one switch for traverse in each direction, one switch for hoisting and one for lowering; switches in the hoist motor circuit and in the traverse motor circuit to stop hoist and traverse; said manual control switches and the circuits controlled thereby being so connected and arranged that once any portion of the cycle is initiated, movement of the bucket will continue until the end of that portion of the cycle, unless the bucket is stopped by said stop switches.

32. A conveyor system comprising a carriage, material-supporting structure adapted to be transported by said carriage, a loading station, track structure for said carriage extending in several directions from said loading station, means for hoisting said material-supporting structure from said loading station toward said carriage, reversible driving means for said carriage, and means responsive to predetermined position of the ascending material-supporting means to effect in proper sequence disabling of said hoisting means therefor and actuation of said carriage-driving means in the proper sense to transport the material-supporting structure in any desired direction from said loading station along the proper track structure.

33. A conveyor system comprising a carriage, material-supporting structure adapted to be transported by said carriage, a loading station, means for hoisting said material-supporting structure from said loading station toward said carriage, reversible driving means for said carriage, track structure for said carriage extending in several directions from said loading station, means responsive to predetermined position of the ascending material-supporting means to effect in proper sequence disabling said hoisting means therefor and actuation of said carriage-driving means to transport the material-supporting structure in a selected direction from said loading station along the proper track structure, and means responsive to predetermined position of the traveling carriage structure for disabling said driving means therefor.

34. A conveyor system comprising loading and unloading stations, a control station, a carriage, an electric motor at said control station for moving said carriage between loading and unloading stations, a material-supporting structure adapted to be transported by said carriage, a second electric motor at said control station for hoisting and lowering said structure toward and away from said carriage, relays located at said control station for controlling the energization and direction of rotation of said motors, and switch structure driven by said motors for controlling relays automatically to effect lowering and hoisting of said structure at said stations and travel of said carriage between said stations.

35. A conveyor system comprising at least one loading station and at least one unloading station, a carriage, an electric motor for moving said carriage between loading and unloading stations, material-supporting structure, a second motor for hoisting and lowering said structure toward and away from said carriage, limit switches responsive to positions of said carriage and structure and relays controlled thereby automatically to effect control of said motors in proper sequence to move said carriage between stations and hoisting and lowering of said structure at said stations, and manually controlled switching mechanism for interrupting automatic operation at any stage and establishing manual control of the carriage and structure for continued movement in the same direction or reverse direction.

36. A conveyor system comprising at least one loading station and at least one unloading station, a carriage, an electric motor for moving said carriage between loading and unloading stations, material-supporting structure, a second electric motor for hoisting and lowering said structure toward and away from said carriage, limit switches for stopping said first motor upon arrival of said carriage at said stations and effecting operation of said second motor for lowering said structure, a retarded-action relay for affording a predetermined time interval before lowering at least one of said stations, a limit switch for stopping said second motor at desired lower position at one of said stations, and a second retarded-action relay adjustable independently of said first retarded-action relay effecting energization of said second motor to hoist said structure after a predetermined interval at the other of said stations.

37. A conveyor system comprising at least one loading station and at least one unloading station, a carriage, an electric motor for effecting movement of said carriage between said stations, material-supporting structure, a second electric motor for hoisting and lowering said structure toward and away from said carriage, limit switches for stopping said first motor upon arrival of carriage at said stations and energizing said second motor for lowering said structure, a retarded-action relay for affording a predetermined time interval before lowering, and means for disabling said retarded relay to permit upon subsequent hoisting of said structure substantially simultaneous deenergization of said second motor and energization of said first motor.

38. A conveyor system comprising at least one loading station and at least one unloading station, a carriage, an electric motor for moving said carriage between loading and unloading stations, material-supporting structure, a second electric motor for hoisting and lowering said structure toward and away from said carriage, limit switches for stopping said carriage at said stations by de-energization of the first motor and for effecting lowering of said structure at lower and upper limits of its travel by control of said second motor, and re-energization of said first motor for movement of said carriage to the other of said stations, and retarded-action relays affording predetermined time intervals before lowering of said structure at said stations, and between lowering and hoisting at the loading station, and means for excluding said retarded-action relays from circuit for the remainder of the operations.

39. An automatic conveyor system comprising a loading station and at least one unloading station, a carriage, an electric motor therefor, material-supporting structure, a second motor for moving said structure toward or away from said carriage, a control system including limit switches and relays for effecting operation of said motors in proper sequence and direction of rotation to transport material from said loading station, manually operable switching means to permit control of said carriage motor, and means including a limit switch rendering said manually operable means inoperative during energization of said second motor.

40. A full automatic conveyor system comprising a carriage, driving means for moving said carriage between loading and unloading stations, a bucket adapted to be transported by said carriage and having doors, motive means for hoisting and lowering said bucket toward and away from said carriage, means operated by the bucket in loading position to permit flow of material to the interior thereof, means for effecting ascent of the bucket by its said motive means after the bucket has been loaded, latch mechanism for said bucket doors tripped upon engagement with material previously discharged at the unloading point to permit discharge of the bucket contents, means responsive to position of the carriage at said stations for disabling its said driving means and for effecting lowering of said bucket by its said motive means, means responsive to predetermined position of the ascending bucket at each of said stations for disabling its said motive means and effecting movement of said carriage structure by its said driving means to the other of said stations, and means operated by said engagement of said bucket while descending at an unloading station for effecting ascent of the bucket by its said motive means, the system when set into operation automatically repeatedly performing the cycle of operations.

41. A conveyor system for discharging material in a pile comprising a bucket having doors, latch mechanism for holding said doors closed, a winding drum, a cable from said drum to said bucket, an electric motor for driving said drum to raise and lower said bucket, and a slack cable switch operated upon engagement of the descending bucket with the top of said pile to reverse said motor to effect hoisting, the engagement also releasing said latch mechanism to permit said doors to open.

42. A conveyor system for discharging material in a pile comprising a dumping bucket, mechanism for holding said bucket closed, means for hoisting and lowering said bucket comprising an electric motor, engagement of the bucket with the pile releasing said holding mechanism for opening the bucket, and switching means responsive to engagement of the bucket with said pile to control said motor to hoist said bucket.

43. An electrically operated carrier system having a carrier arranged to be driven between a loading station and a selected unloading station, motor means for driving said carrier, a plurality of sequence relays, a plurality of switches operated in accordance with the position of said carrier with respect to said stations, a plurality of successively energized control circuits each of which includes at least one of said sequence relays and one of said switches for controlling the energization of said motor means, to continuously drive said carrier back and forth between said stations, the said sequence relays providing for the electrical interlocking of said control circuits.

44. In a traversing hoist having a material carrier and reversible direct current hoist and traverse motors and primary circuits therefor; the combination of secondary control circuits connected with the primary circuits; means for controlling the secondary circuits; interlocking circuits connecting the primary circuits so that traversing while hoisting and lowering while traversing are made impossible; adjustable means connecting the aforesaid controlling means with the hoist and traverse motors so that the control circuits govern the primary circuits according to a predetermined and operator-adjusted cycle, thereby to effect automatically hoisting, traversing, lowering, hoisting, return-traversing, and lowering of the material carrier to the starting point; a dynamic brake resistor for the hoist motor; means to short-circuit said resistor across the armature of the hoist motor whenever the hoist motor circuit opens; and switch means to govern operation of the traversing hoist.

45. A traversing hoist installation comprising, in combination, a material carrier; a reversible traverse motor for causing the carrier to move back and forth; a reversible hoist motor; a drum driven by said hoist motor and a cable wound upon the drum and supporting the material carrier; traverse and hoist motor circuits each including reversing main contactors and selecting contactors for determining which of the reversing contactors will close; switches for controlling closing of the selecting contactors; slow speed, power driven mechanisms to actuate said switches; a cable-tension-operated switch which reverses the hoist motor and causes the carrier to ascend when the carrier strikes an obstacle and thus lessens the cable tension; and operator controlled switches to control both motor circuits.

46. A traversing hoist installation comprising, in combination, a material carrier; a reversible traverse motor for causing the material carrier to move back and forth; a traverse motor circuit including reversing main contactors and selecting contactors for determining which of the reversing contactors will close; switches for controlling closing of the selecting contactors; mechanism driven at slow speed synchronously with the material carrier when traversing to actuate said switches; said mechanism being adjustable to actuate said switches at different times in the traverse in either direction, so that the direction as well as the amount of traverse may be governed by proper adjustment of said mechanism; a reversible hoist motor; a circuit therefor; interlocking circuits so arranged as to prevent traversing while hoisting and lowering while traversing; and operator controlled switches to govern both motor circuits.

47. A traversing hoist installation comprising, in combination, a material carrier; a reversible traverse motor for causing the material carrier to move back and forth; a reversible hoist motor; traverse and hoist motor circuits each including reversing main contactors and selecting contactors for determining which of the reversing contactors will close; switches for controlling closing of the selecting contactors; power driven mechanism to actuate said switches; the power driven mechanism and the switches being so constructed and arranged that the proper selecting contactor is closed before the carrier returns to the trolley for the traverse in the direction determined by said selecting contactor; and operator controlled switches to govern operation of the material carrier.

48. An electrically operated, automatic trolley bucket installation having means for sending the bucket through a cycle comprising hoisting, traversing, lowering, hoisting, return-traversing and lowering to the starting point, and for repeating said cycle indefinitely; and time-controlled means for causing the bucket to pause while in loading position; said last named means being adjustable by the operator to increase or diminish the time interval during which the bucket is stationary for loading.

HAROLD E. HALLENBECK.